(12) United States Patent
Wieczorek

(10) Patent No.: US 7,211,801 B2
(45) Date of Patent: May 1, 2007

(54) RADIATION DETECTOR

(75) Inventor: Herfried Karl Wieczorek, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 242 days.

(21) Appl. No.: 10/527,890

(22) PCT Filed: Aug. 4, 2003

(86) PCT No.: PCT/IB03/03414

§ 371 (c)(1),
(2), (4) Date: Mar. 15, 2005

(87) PCT Pub. No.: WO2004/027453

PCT Pub. Date: Apr. 1, 2004

(65) Prior Publication Data

US 2005/0258369 A1  Nov. 24, 2005

(30) Foreign Application Priority Data

Sep. 18, 2002 (EP) ................................. 02078859

(51) Int. Cl.
*G01T 1/20* (2006.01)

(52) U.S. Cl. .................................................... 250/366
(58) Field of Classification Search ................ 250/366;
378/154, 9, 19, 92
See application file for complete search history.

(56) References Cited

U.S. PATENT DOCUMENTS

| 5,821,540 A | 10/1998 | Sato et al. | |
| 6,864,484 B1 * | 3/2005 | Zur | 250/370.09 |
| 7,112,799 B2 * | 9/2006 | Vogtmeier | 250/370.09 |

FOREIGN PATENT DOCUMENTS

WO    WO 00/25149    5/2000

\* cited by examiner

*Primary Examiner*—David Porta
*Assistant Examiner*—Christopher Webb

(57) ABSTRACT

A radiation detector comprises a plurality of detector units and x-ray absorption members placed between the respective detector units. An individual detector unit includes a sensor element and read-out circuitry. The x-ray absorption members have a wider portion and a narrower portion and the read-out circuitry is accommodated at the narrower portion of the x-ray absorption member. Hence, the read-out circuitry is shielded from incident x-rays by the wider portion.

5 Claims, 2 Drawing Sheets

RADIATION DETECTOR

Figure 1:
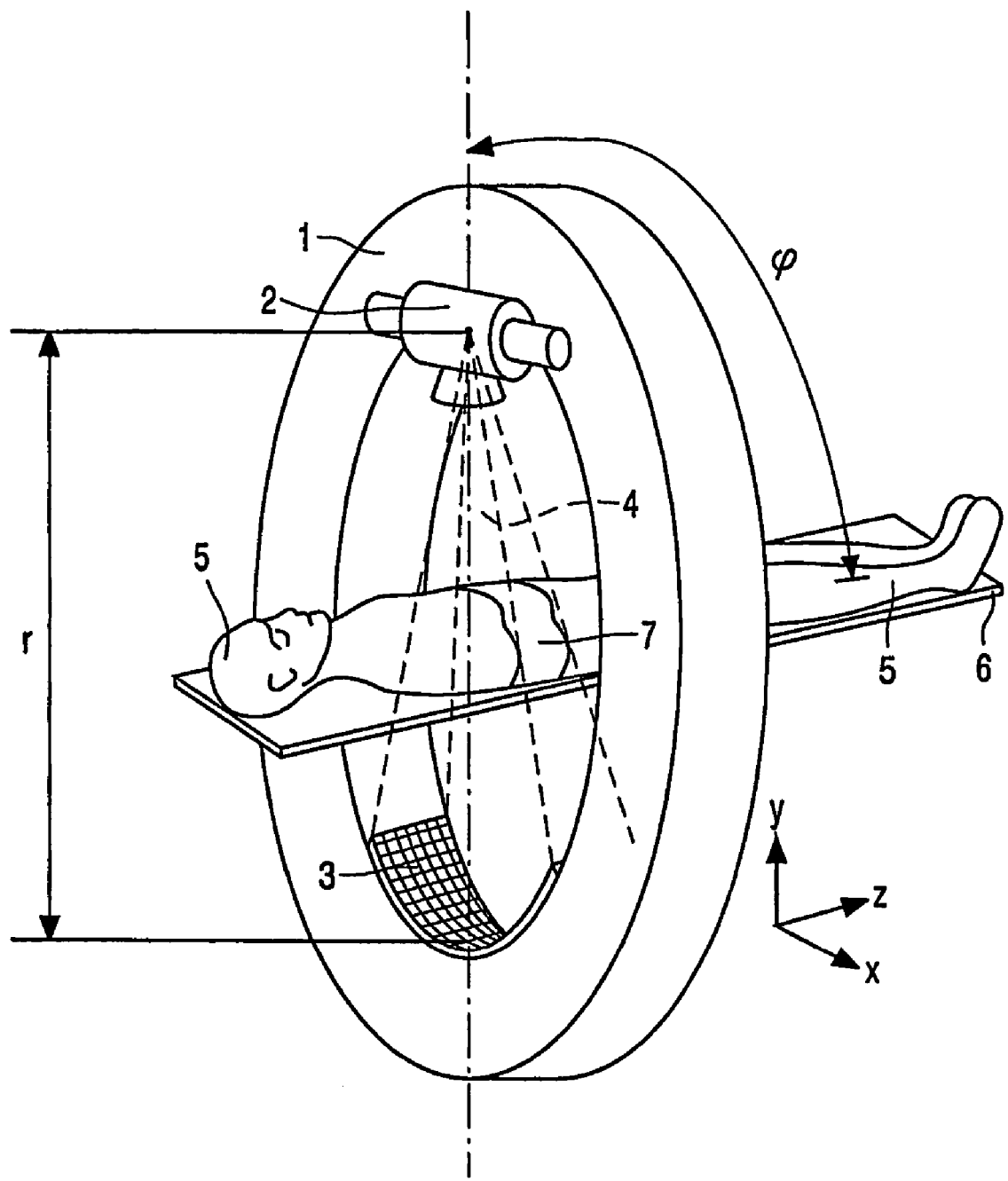

The invention pertains to a radiation detector comprising
a plurality of detector units
x-ray absorption members which in a lateral direction separate at least a part of the respective detector units
an individual detector unit including a sensor element and read-out circuitry.

Such a radiation detector is known from the international application WO 00/25149.

The known radiation detector is an x-ray computed tomography detector. The known radiation detector includes a scintillator which is constructed as a matrix of scintillator elements. The individual detector units of the known radiation detector include a scintillator element and a photosensor which acts as the sensor element. The scintillator converts incident radiation into radiation of a lower energy level for which the photosensor is sensitive. In particular, monocrystalline or polycrystalline cadmium tungstate or gadolinium oxy-sulfide is used for the scintillator elements. The sensor element in the known radiation detector is a detector chip that is preferably manufactured using CMOS technology. X-ray absorbing members are arranged as absorber layers that extend vertically relative to the surface of the scintillator. The individual detector units have their individual amplifiers elements which are placed directly underneath the absorber layers so as to shield the individual amplifiers from the incident radiation. Individual detector units have their respective read-out circuitry in which the amplifier of the relevant detector unit forms part.

Because the amplifier elements must be very accurately aligned with the absorber layers, the amplifier elements must be very precisely positioned and this leads to a cumbersome step in the manufacturing process of the known radiation detector.

An object of the invention is to provide a radiation detector in which electronic circuitry which is sensitive for radiation is shielded and which can be manufactured in a more simple manner.

This object is achieved in a radiation detector according to the invention wherein
the x-ray absorption members have a wider portion and a narrower portion
the read-out circuitry being accommodated at the narrower portion of the x-ray absorption member.

According to the invention the read-out circuitry is placed in the narrower portion which for example is shaped as a recess in the absorption member. Thus, the read-out circuitry placed in the narrower portion, e.g. the recess, is then shielded from incident radiation by the wider portion. Hence, in particular parts of the read-out circuitry that is sensitive, such as the amplifier to radiation is protected. According to the invention only a portion, notably the portion which is most sensitive to radiation, of the entire read-out circuitry of individual is placed at the narrower portion, for example in the recess of the absorption member. The detector units are arranged as a linear array or as a matrix having rows and columns of detector units. The lateral direction is along the longitudinal axis of the linear array or is in the surface of the matrix. The x-ray absorption members separate respective, for example adjacent detector units so as to avoid cross-talk which may be caused by scattered x-rays. These and other aspects of the invention will be further elaborated with reference to the embodiments defined in the dependent Claims.

In a preferred embodiment of the radiation detector of the invention the individual detector units have several sensor elements which are stacked in the transverse direction. The transverse direction is substantially transverse to the lateral direction in which the detector units are arranged next to one another. The read-out circuitry, notably at least the portion of the read out circuitry that is radiation sensitive for the respective sensor elements of the detector unit at issue are placed at the narrower portion of the absorption member. In this preferred embodiment the several sensor elements in the stack in the detector unit at issue are placed about along the direction of the incident radiation. That is, the sensor elements in an individual detector unit are placed behind each other about along the propagation direction of the incident radiation. As each sensor element absorbs and/or attenuates some of the incident radiation, as sensor elements are placed further to the rear of the radiation detector, relative to the side of the radiation detector on which the radiation is received, the energy of the radiation which reaches the sensor elements is higher. Hence, this embodiment is quite suitable to detect radiation where the radiation intensity can be resolved both spatially and energy spectrally.

In particular the radiation detector is able to detect x-radiation. This is achieved by employing a scintillator which is sensitive to x-rays in that the scintillator converts x-radiation into radiation of a lower energy, having a wavelength in the range of 380 nm to 750 nm, preferably e.g. green light is used as the radiation of a lower energy. Suitable materials for the scintillator are for example cadmium tungstate ($CdWO_4$) or Gadolinium-oxysulfide doped with Praseodymium, Fluor or Cerium ($Gd_2O_2S$:Pr,F, Ce). The sensor elements are provided with a photosensor which is sensitive to the radiation of lower energy. It is noted that the x-ray absorbing members preferably also absorb the radiation of lower energy so as to avoid so-called optical cross talk that may occur when radiation of lower energy is allowed to reach a neighbouring detector unit. As an alternative the sensor elements may include x-radiation sensitive photoconductor elements which converts incident x-radiation into electric charge which is subsequently read out by way of the read out circuitry.

The radiation detector of the invention as an x-ray detector is particularly suitable to be employed in an x-ray examination apparatus in which the x-ray detector receives an x-ray projection image from which it derives an image signal, such as an electronic video signal. The radiation detector of the invention is also particularly suitable to be employed in a computed-tomography system in which the x-ray detector forms attenuation profiles from incident x-radiation which has passed through he object to be examined from several orientations. From these attenuation profiles an image data set is reconstructed representing local densities in the object. The image data set may relate to one or several cross sections through the object, but the image data set may also pertain to a reconstructed volume of the object to be examined. In particular the x-ray detector when employed in a computed tomography system is preferably arranged as a two-dimensional detector which can acquire attenuation profiles from several slices in the object simultaneously or which can acquire attenuation profiles from a cone shaped x-ray beam.

In particular the radiation detector according to the invention is able to detect positron emission. This is achieved by employing a scintillator which is sensitive to x-rays in that the scintillator converts positron emission into radiation of a lower energy, having a wavelength in the range of m 300 nm to 550 nm, e.g. ultraviolet, blue or green light. Suitable scintillator materials are e.g. NaI:Tl, $LaBr_3$:Ce, $Gd_2SiO_5$:Ce or $Lu_2SiO_5$:Ce. The sensor elements are provided with a photosensor which is sensitive to the radiation of lower energy, or alternatively with a converter layer that converts the radiation of lower energy, e.g. ultraviolet radiation, into still lower energy, e.g. green light. As an alternative the sensor elements may include a positron emission sensitive photoconductor elements which converts incident positron emission into electric charge which is subsequently read out by way of the read out circuitry.

In a further preferred embodiment of the radiation detector of the invention, part of the detector units are substantially sensitive for x-radiation. These x-ray sensitive detector units form the first group. Another part of the detector units are substantially sensitive for positron radiation. These positron radiation sensitive detector units form the second group. This embodiment of the radiation detector is able to simultaneously detect x-radiation and positron radiation. Accordingly, this embodiment of the radiation detector is advantageously used in combined examination which involves for example x-ray computed tomography (CT) with positron emission tomography (PET). Because the same radiation detector is used according to the invention for both application of the combined examination, there is less need or no need at all for mutual registration of e.g. the CT and PET images. Moreover, patient throughput time is reduced because both the e.g. CT and PET scans to acquire to x-ray CT data and the PET data are performed in a single examination. Accordingly, the combined examination procedure is more comfortable for the patient to be examined.

Further the radiation detector of the invention is suitable for application in combined examinations that involve x-ray CT and Single Photon Emission Computed Tomography (SPECT). SPECT involves emission of gamma (γ) radiation photons. It has appeared that the detector units have some overlap in the sensitivity for x-rays and for gamma-rays.

Figure 2:
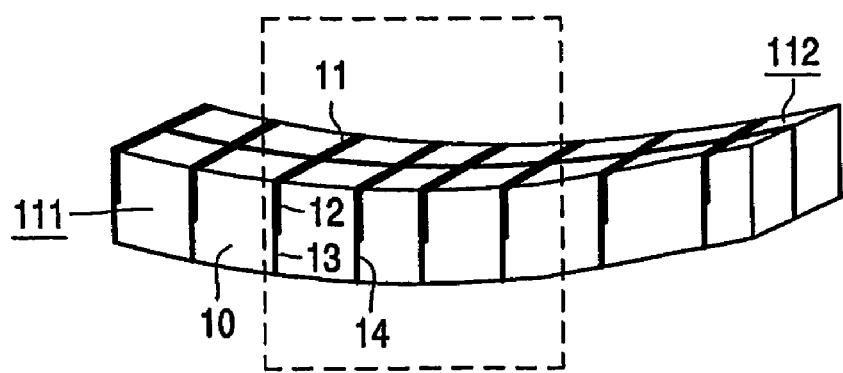
Figure 3:
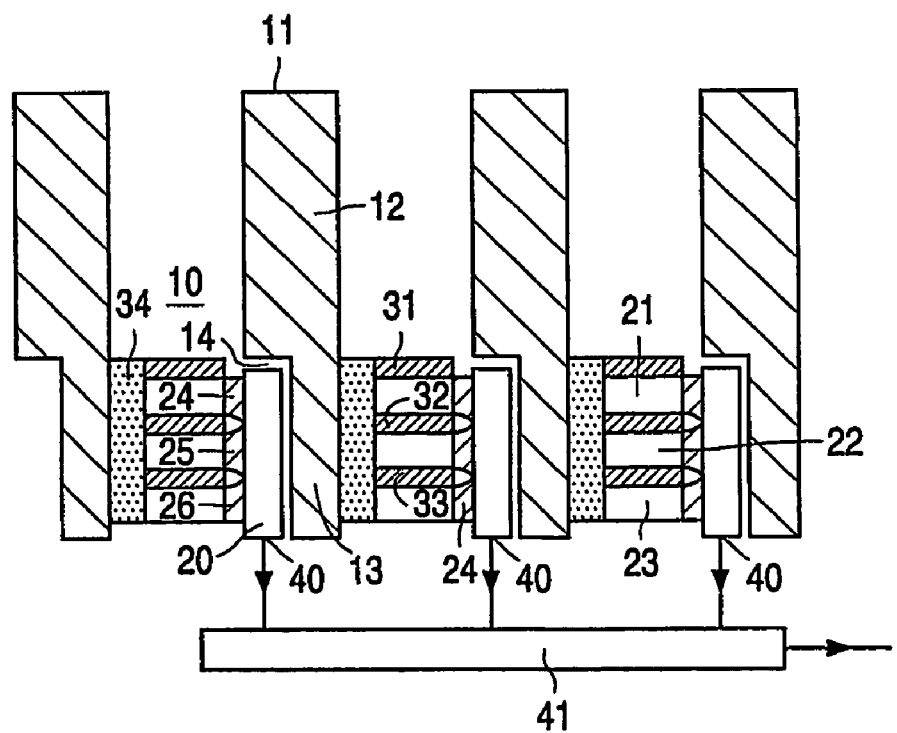

These and other aspects of the invention will be elucidated with reference to the embodiments described hereinafter and with reference to the accompanying drawing wherein FIG. 1 shows diagrammatically a computed-tomography system in which the x-ray detector according to the invention is employed as a multi-line detector 3 which is formed as a detector array, FIG. 2 shows a schematic representation of the x-ray detector in the computed-tomography system of FIG. 1 and FIG. 3 shows details of a portion of the x-ray detector of FIG. 2.

FIG. 1 shows diagrammatically a computed-tomography system with a multi-line detector 3 which is formed as a detector array. The X-ray source 2 as well as the facing multi-line detector 3 are mounted in a circular portal frame or gantry 1. The X-ray source 2 emits a cone-shaped X-ray beam 4 through the patient 5 and onto the multi-line detector 3. The patient 5 to be examined is transported through the rotating gantry 1 on a table 6.

The detector array 3 is arranged at a distance r from the focus of the X-ray source 2. During a complete revolution of the gantry 1, the X-ray beam 4 irradiates the patient 5 in the gantry plane from different directions φ relative to the normal to form respective attenuation profiles which are received by the multi-line detector. A cross-sectional image 7 of the patient in the irradiated zone is reconstructed on the basis of these attenuation profiles.

The detector array 3 is composed of a plurality of detector units which are arranged in a plurality of rows. These rows extend in parallel in the direction of the axis of rotation (z direction).

FIG. 2 shows a schematic representation of the radiation detector which operates as an x-ray detector in the computed-tomography system of FIG. 1. FIG. 3 shows details of a portion of the x-ray detector of FIG. 2. The x-ray detector of FIG. 2 has two rows 111, 112 of detector units 10. Adjacent detector units are separated by absorption members in the form of lead lamellae 11 that extend transversely to the surface of the x-ray detector. These lead lamellae 11 intercept scattered x-rays and avoid cross talk between neighbouring detector units. Individual absorption members comprise a wide portion 12 and a narrow portion 13 so that a recess 14 is formed. The wide portion is located toward the side of the radiation detector where the radiation e.g. the x-rays, is incident. Individual detector units comprise several sensor elements which include scintillator crystals 21, 22 and 23, photodiodes 24, 25 and 26 and read-out circuitry 20. Individual sensor elements are provided with reflecting layers 31,34. Preferably these reflecting layers surround most of the respective scintillator crystals. Incident x-rays are converted into lower energy radiation e.g. green light in the scintillator crystals and detected by the photodiodes. Green light that upon generation at first propagates away from the photodiodes is directed to the photodiodes by the reflecting layers 31, 34. The photodiodes form electric charges from the incident lower energy radiation such as green light for which the photodiodes are sensitive. The electric charges from the respective sensor elements are read-out by individual read-out circuits 20. The read-out circuits of the respective sensor elements are placed in the recesses 14. Hence, the read-out circuits are shielded from incident and scattered x-rays which are intercepted by the wider portions 12 of the x-ray absorbing lamellae 11. In particular radiation sensitive parts, such as amplifiers of the read-out circuit are placed in the recesses 14.

The read-out circuits have their output ports 41 electrically coupled to a signal channel 41 which carries the signal to an image signal output (not shown).

The invention claimed is:

1. A radiation detector comprising a plurality of detector units x-ray absorption members which in a lateral direction separate at least a part of the respective detector units an individual detector unit including a sensor element and read-out circuitry, wherein the x-ray absorption members have a wider portion and a narrower portion the read-out circuitry being accommodated at the narrower portion of the x-ray absorption member.

2. A radiation detector as claimed in claim 1, wherein an individual detector unit comprises several sensor elements being stacked in a transverse direction.

3. A radiation detector as claimed in claim 1, wherein the detector units are substantially sensitive for x-radiation.

4. A radiation detector as claimed in claim 1, wherein the detector units are substantially sensitive for positron radiation.

5. A radiation detector as claimed in claim 1, having a first group of detector units which are substantially sensitive for x-radiation and a second group of detector units which are substantially sensitive for positron radiation.

* * * * *